United States Patent
Milstein (10) Patent No.: US 9,912,806 B1
(45) Date of Patent: Mar. 6, 2018

(54) COMPUTER-IMPLEMENTED SYSTEM AND METHOD FOR DETERMINING CALL STATUS

(71) Applicant: Intellisist, Inc., Seattle, WA (US)

(72) Inventor: David Milstein, Redmond, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 15/723,093

(22) Filed: Oct. 2, 2017

Related U.S. Application Data (63) Continuation of application No. 15/420,027, filed on Jan. 30, 2017, now Pat. No. 9,781,256, which is a
(Continued)

(51) Int. Cl.
*H04M 1/66* (2006.01)
*H04M 3/42* (2006.01)
(Continued)

(52) U.S. Cl.
CPC .... *H04M 3/42042* (2013.01); *H04L 63/0823* (2013.01); *H04L 63/126* (2013.01); *H04M 1/72525* (2013.01); *H04M 3/42059* (2013.01); *H04M 3/42161* (2013.01); *H04W 4/20* (2013.01); *H04W 12/02* (2013.01); *H04W 12/06* (2013.01); *H04W 12/10* (2013.01); *H04L 63/0428* (2013.01); *H04M 2203/609* (2013.01);
(Continued)

(58) Field of Classification Search
CPC ......... H04M 3/42042; H04M 1/72525; H04M 1/73; H04M 1/66; H04W 4/20; H04W 12/06; H04W 12/10; H04L 63/0823; H04L 63/126; H04L 63/0428; G06F 21/34; G01R 31/3606

USPC .......... 455/411; 705/44, 59, 14.35; 380/255
See application file for complete search history.

(56) References Cited

U.S. PATENT DOCUMENTS 7,039,165 B1 * 5/2006 Saylor ................... H04M 3/493
                                                    379/142.15
7,359,881 B2 * 4/2008 Stefik ....................... G06F 21/10
                                                    375/E7.009
(Continued)

FOREIGN PATENT DOCUMENTS

EP          1806934        7/2007
WO       20070013966       2/2007
(Continued)

OTHER PUBLICATIONS

Cisco Unified Communications Manager Security Guide, Release 8.6(1), "CISCO Phone Security Overview", www.cisco.com/en/US/docs/voice_ip_comm/cucm/security/8_6_1/secugd/secuphne.html.

*Primary Examiner* — Mahendra Patel
(74) *Attorney, Agent, or Firm* — Patrick J.S. Inouye; Krista A. Wittman (57) ABSTRACT

A computer-implemented system and method for determining call status is provided. A call from a caller to a recipient is identified and an identity of the caller is determined. A determination is made as to whether a security certificate of the caller is available. A status of the call is determined based on one of a presence and an absence of the security certificate. The identity of the caller is provided to the recipient. A type of notification for the call status is determined based on a type of the call status and the notification is delivered with the caller identity.

20 Claims, 7 Drawing Sheets

Related U.S. Application Data continuation of application No. 15/168,193, filed on May 30, 2016, now Pat. No. 9,560,196, which is a continuation of application No. 14/067,853, filed on Oct. 30, 2013, now Pat. No. 9,357,382.

(60) Provisional application No. 61/720,954, filed on Oct. 31, 2012.

(51) Int. Cl.

| | | |
|---|---|---|
| *H04L 29/06* | (2006.01) | |
| *H04M 1/725* | (2006.01) | |
| *H04W 12/02* | (2009.01) | |
| *H04W 12/06* | (2009.01) | |
| *H04W 12/10* | (2009.01) | |
| *H04W 4/20* | (2018.01) | |

(52) U.S. Cl.
CPC ............ *H04M 2203/6045* (2013.01); *H04M 2242/10* (2013.01)

(56) References Cited

U.S. PATENT DOCUMENTS

| | | | |
|---|---|---|---|
| 8,010,365 B1* | 8/2011 | Collins | G10L 15/26 378/88 |
| 8,533,581 B2 | 9/2013 | Krall et al. | |
| 8,627,422 B2* | 1/2014 | Hawkes | H04L 63/166 380/255 |
| 2003/0002633 A1* | 1/2003 | Kredo | H04L 51/04 379/88.08 |
| 2003/0236748 A1 | 12/2003 | Gressel et al. | |
| 2007/0022469 A1* | 1/2007 | Cooper | H04K 1/00 726/3 |
| 2007/0130023 A1 | 6/2007 | Wolinsky et al. | |
| 2007/0156726 A1 | 7/2007 | Levy | |
| 2007/0162337 A1* | 7/2007 | Hawkins | G06Q 30/02 705/14.27 |
| 2008/0109883 A1* | 5/2008 | Hernoud | G06F 21/32 726/5 |
| 2008/0112551 A1* | 5/2008 | Forbes | H04M 3/42042 379/142.1 |
| 2008/0141331 A1* | 6/2008 | Tasker | H04L 63/0428 726/1 |
| 2009/0282397 A1* | 11/2009 | Leporini | G06F 21/51 717/174 |
| 2011/0072499 A1* | 3/2011 | Lin | G06F 21/35 726/6 |
| 2011/0113122 A1* | 5/2011 | Drope | G06F 17/30017 709/219 |
| 2011/0283174 A1* | 11/2011 | M'Raihi | H04L 29/12066 715/205 |
| 2012/0330769 A1 | 12/2012 | Arceo | |
| 2013/0117400 A1* | 5/2013 | An | H04L 63/0823 709/206 |
| 2013/0276076 A1 | 10/2013 | Gupta et al. | |

FOREIGN PATENT DOCUMENTS

| | | | |
|---|---|---|---|
| WO | 2008089626 | 7/2008 | |
| WO | WO 2008089626 A1 * | 7/2008 | ............ H04M 1/663 |
| WO | 20120107296 | 8/2012 | |

\* cited by examiner

COMPUTER-IMPLEMENTED SYSTEM AND METHOD FOR DETERMINING CALL STATUS

CROSS-REFERENCE TO RELATED APPLICATION

This non-provisional patent application is a continuation of U.S. patent application Ser. No. 15/420,027, filed Jan. 30, 2017, which is a continuation of U.S. Pat. No. 9,560,196, issued Jan. 31, 2017, which is a continuation of U.S. Pat. No. 9,357,382, issued May 31, 2016, which claims priority under 35 U.S.C. § 119(e) to U.S. Provisional patent application Ser. No. 61/720,954, filed Oct. 31, 2012, the disclosures of which are incorporated by reference.

FIELD

The present invention relates in general to call security and, in particular, to a computer-implemented system and method for determining call status.

BACKGROUND

Telephone use has heavily increased since the introduction of mobile telephones, which users can utilize, not just in their homes, but in their cars, while walking, at work, and during daily activities. While telephone usage can be casual, such as talking with friends, other usage may require the disclosure of sensitive information, such as when making a purchase over the phone, paying a bill, or providing medical information.

Users may be hesitant to provide the required sensitive information due to concerns that a breach of the sensitive information could occur based on, for example, man-in-the-middle attacks. Telephone lines that are not secure are open to such attacks. Another concern is whether the person to whom the user is providing the sensitive information is trusted or is associated with a trusted party. For example, a user receives a call from his doctor's office asking for personal information, such as mailing address or credit card information to resolve an outstanding bill. When the call is received, the user may be able to determine the telephone number and possibly the owner of the telephone number using caller ID. However, on mobile telephones, the owner of the telephone number only appears if the telephone number is programmed into the phone and the calling party calls from that specific telephone number. Further, the user is unable to determine whether the incoming call is made over a secure connection.

Attempts to secure telephone connections have been made by encrypting voice data transmitted via the call. Yet, notice of the secure connection is not provided to the other party. Conversely, secure Web pages display information informing a user that the Web site is secure and sensitive information will be protected. For instance, Web pages are made secure using Secure Socket Layer (SSL). Using SSL, data transmitted between a Web page and Web servers are encrypted so that the data is not legible or accessible by unauthorized third parties. Users are can identify whether a Web page is secure by looking for a lock icon in a status bar of a Web browser in which the Web page is displayed, locating a site seal provided by a SSL vendor, if present, and the letter "s" listed with a protocol of a uniform resource locator for the Web page.

Cisco Unified IP Phones, of Cisco Systems, Inc., San Jose, Calif., use Cisco Unified Communications Manager to provide security icons to be enabled. The icons indicate whether a call is secure and whether a connected device is trusted. A trusted device includes a Cisco device or a third-party device that has passed Cisco security criteria for trusted connections. A determination as to whether a device is trusted is made when the device is added to a user system. However, the Unified Communications Manager can only be utilized when an individual purchases a particular Cisco telephone. Thus, the Unified Communications Manager fails to address providing connection notifications to a global collection of landline and mobile telephones, and maintaining a log of calls with connection notifications.

Accordingly, a system and method to verify whether a call is secure and to notify users of a status of the call connection is needed to prevent users from fraud and unauthorized disclosure of personal information.

SUMMARY

To ease a user's concerns regarding providing sensitive information over the telephone, verification of a secure telephone connection should be made and provided to the user. The user can initiate a call to or receive a call from a participating party. Metadata regarding the participating party is collected and used to determine whether the call connection is secure. A decision regarding the verification is displayed to the user who can then decide whether to continue or end the call, or whether to provide or refuse providing sensitive information. Specifically, a decision that the call connection is secure or that the call connection is not secure can be displayed on a screen of a mobile phone, as a sound or light display on a landline phone, or as a text message, including SMS text messages, email, or social network message.

An embodiment provides a computer-implemented system and method for determining call status. A call from a caller to a recipient is identified and an identity of the caller is determined. A determination is made as to whether a security certificate of the caller is available. A status of the call is determined based on one of a presence and an absence of the security certificate. The identity of the caller is provided to the recipient. A type of notification for the call status is determined based on a type of the call status and the notification is delivered with the caller identity.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Users are more likely to provide sensitive information if they know that the connection over which the information is to be provided, is secure. Users are often requested to provide sensitive information over a telephone line. However, users are unable to verify whether a call connection is secure and whether the information, if provided, will be protected. Therefore, to encourage the user to provide the requested information, a status of a call connection should be verified and displayed to a caller upon initiation of a telephone call.

Figure 1:
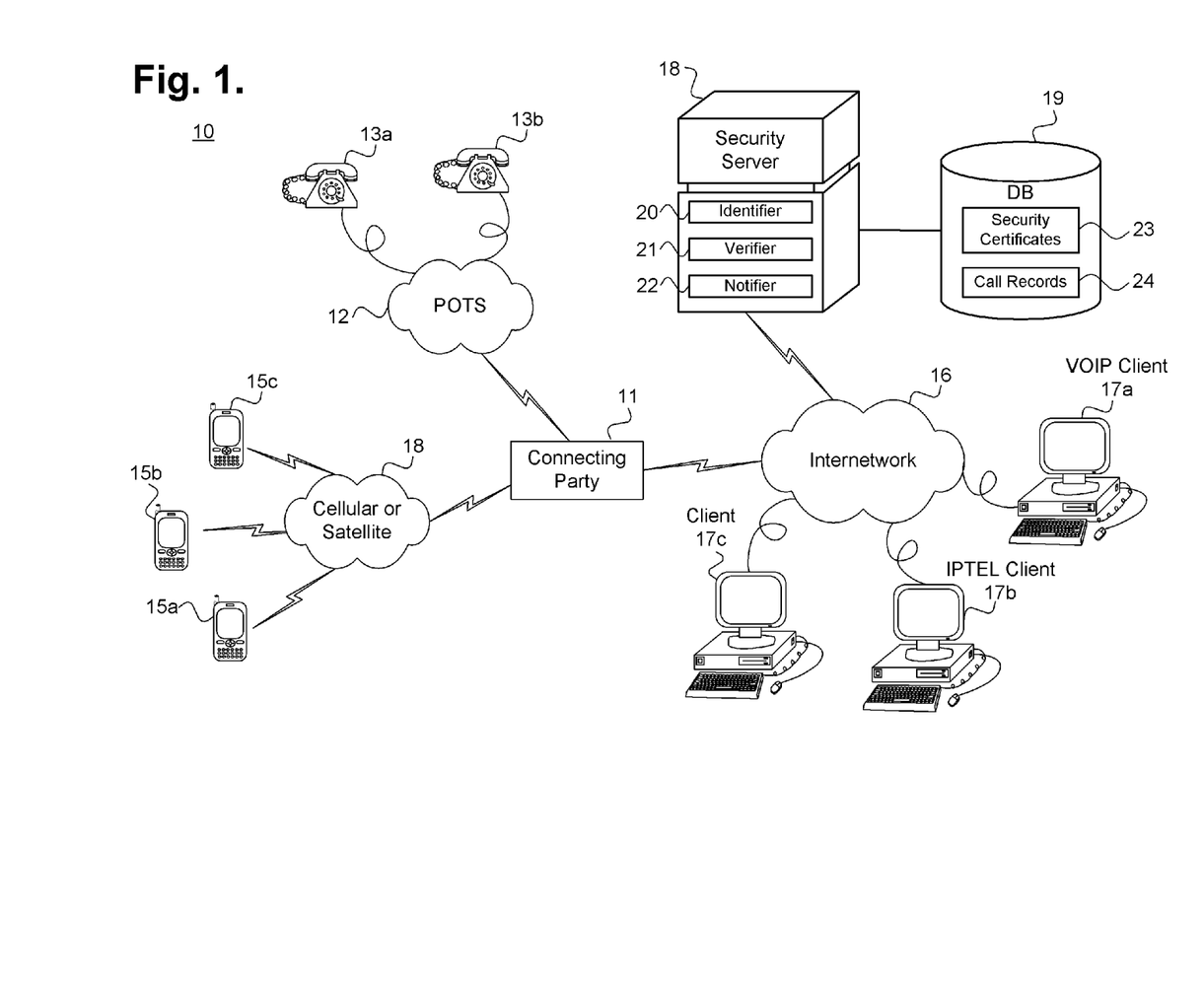
FIG. 1 is a block diagram showing a system for providing notice of validated call connections, in accordance with one embodiment.

Verification of a call connection and providing notice of the verification can assist a user in determining whether to provide sensitive information to another party during a voice interaction, such as a telephone call. FIG. 1 is a block diagram showing a system for validating secure connections, in accordance with one embodiment. A user can communicate through a call with a connecting party 11 via conventional telephone handsets 13a-c through Plain Old Telephone Service (POTS) 12, portable handsets 15a-c through cellular and satellite telephone service 14, and VoIP clients 17 and Internet telephony clients 18, as well as other forms and combinations of telephony, message, and voice-based communications via an internetwork 16, such as the Internet. A call can be a voice interaction over a landline telephone, mobile telephone, or via computers over the internetwork between the user and a connecting party. Other voice interactions are possible. The user is a party, such as an individual or business entity that wants to verify whether a call connection with a connecting party is secure. Conversely, the connecting party 11 is an individual or business entity whose identity can be determined and call connection is verified.

The call can be initiated by the user to the connecting party or alternatively, by the connecting party to the user. Once the call is connected and the caller hears a ring, metadata, including a security certificate, is collected from the connecting party, regardless of whether the connecting party is the caller or the recipient. The collected metadata is transmitted to a security server 18 via the internetwork 16. The security server 18 includes an identifier 20, a verifier 21, and a notifier 22. The identifier 20 determines an identity of the connecting party, while the verifier 21 verifies a status of the call connection by examining the metadata of the connecting party and by determining whether the connection of the connecting party is secure. The connection associated with the connecting party can be determined to be secure if the data transmitted from the connecting party to the user is encrypted. Other types of secure connections are possible. The notifier 22 generates and provides a notification to the user, which can include the identity of the connecting party and whether the connection of the connecting party is secure. The notification is further discussed below with reference to FIGS. 3-6.

A database 19 is interconnected to the security server 18 and can store the metadata, including security certificates 23 or call records 24, which are based on previous calls by the user and the connecting party. The call records 24 can be stored by call or by party, such as for the user and each of the connecting parties. The call records can include an identity of the caller and the recipient, a time and date, and a verification status of the call connection.

In one embodiment, verification and notification of a call connection is initiated based on a request from the user. Specifically, the user can send a request to the security server 18, prior to any communication with a connecting party, to access a Web page (not shown), which can be downloaded on a device associated with the user, such as a mobile telephone 15a-c or computer 17a-c. The user can send a further request to the security server 18, via the Web page, to transfer call information, such as metadata, to the security server 18 upon receipt. Once the user request is accepted, the security server 18 can monitor incoming and outgoing calls of the user, and can verify the connection of the connecting party as caller or recipient, respectively.

The handsets 13a-b, 15a-c, computers 17a-c, and security server 11 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Additionally, the handsets 13a-b, 15a-c, computers 17a-c, and security server 11 can each include one or more modules for carrying out the embodiments disclosed herein. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
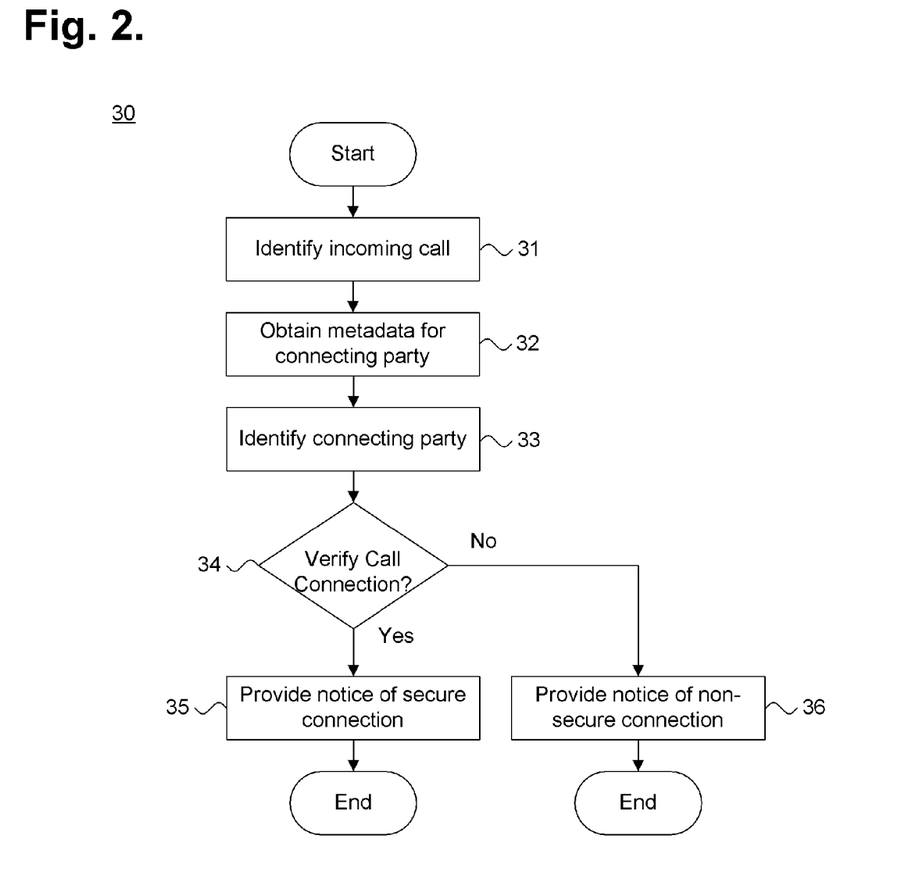
FIG. 2 is a flow diagram showing a method for providing notice of validated call connections, in accordance with one embodiment.

Validating a secure or non-secure call connection can assist a user in determining whether to participate in a call associated with the connection. FIG. 2 is a block diagram showing a method for providing notification of a verified call connection, in accordance with one embodiment. An incoming call is identified (block 31). The incoming call can be initiated by a user or a connecting party with whom the user can communicate. Metadata regarding the connecting party is obtained (block 32). The metadata is analyzed to determine an identity of the connecting party (block 33) and whether a connection of the connecting party is secure (block 34). The metadata can include an identity of the connecting party, a location of the connecting party, and a signature to associate an encryption key with the connecting party. The identity of the connecting party can include a name, telephone number, unique identification code, or other identifiers. Other metadata is possible. In one embodiment, the metadata can be obtained from a security certificate associated with the connecting party.

A secure connection can be determined when a security certificate is present. If a secure connection is detected (block 34), a notification of the secure connection is provided (block 35) to the user. Otherwise, if a secure connection is not detected (block 34), for example, no security certificate is present, a notification of the non-secure connection is provided (block 36) to the user. The type of notification provided can be determined based on the device used by the user to communicate. For example, the notification can be provided as a display on a screen of a mobile device or a computer, as a sound through a conventional telephone, or as a text message, Instant Message, or email.

Figure 3:
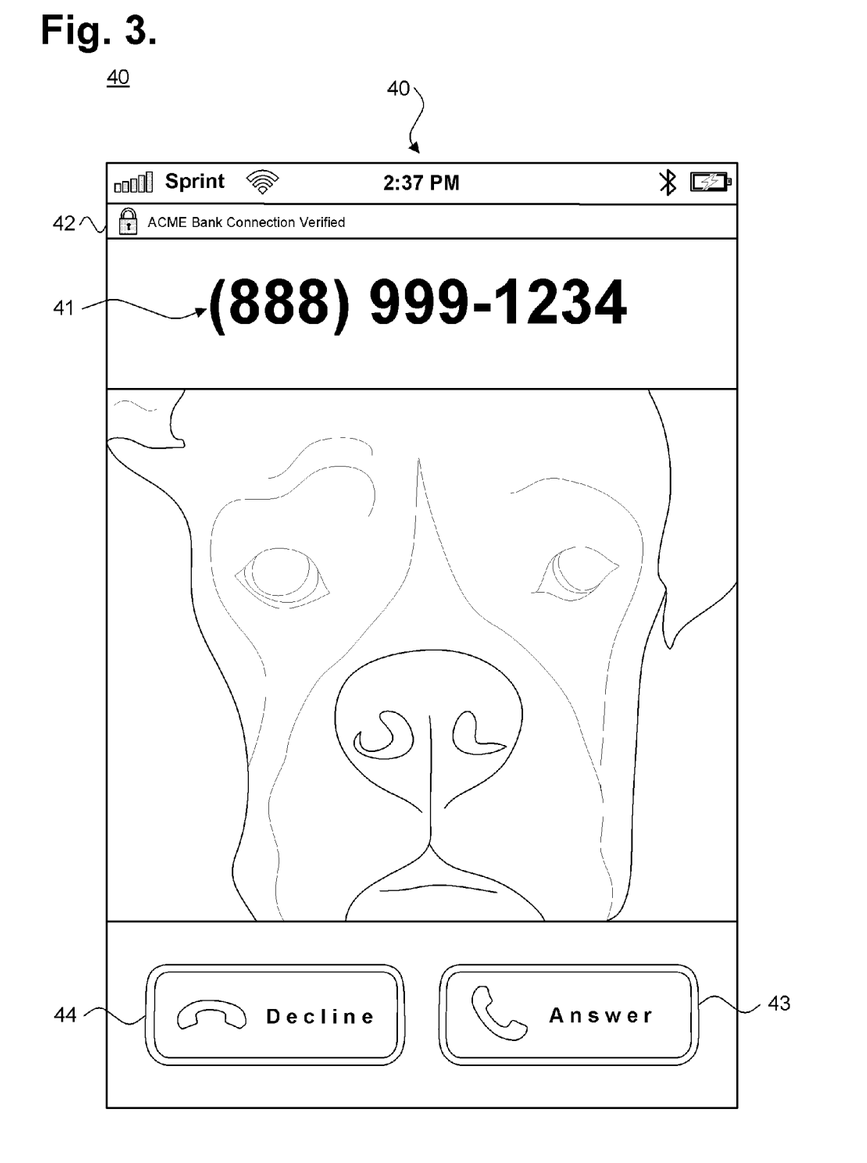
FIG. 3 is a screenshot showing, by way of example, notice of a secure call connection for an incoming call.

When provided as a display, the notification can be one or more of a picture, symbol, or text that appears on a screen of a computing device, such as a mobile telephone or computer. FIG. 3 is a screenshot 40 showing, by way of example, notice 42 of a secure call connection for an incoming call. An incoming call 41 is identified and displayed on a screen of a mobile device, such as a mobile computing device. The incoming call can be displayed using an identity of the caller, such as the connecting party. The identity can include a name or telephone number, as well as other identifiers. A status of the incoming call connection from the connecting party is verified by identifying metadata, if any, associated with the connecting party, and analyzing the metadata. In one example, the metadata can include a security certificate. If the metadata indicates that the connection is secure, a visual notification 42 of the secure connection can be displayed. Specifically, in one embodiment, the connection can be determined to be secure when a security certificate is present.

The notification 42 can include a verification of the secure connection and a further identity of the connecting party that called the user, which can be displayed via one or more of symbols, drawings, or text. The further identification of the connecting party can include a name, which indicates that the telephone number 51 is a verified number of the named connecting party. The further identification can also include telephone number or location, if not previously provided. In one embodiment, the notification 42 includes a lock symbol, indicating a secure connection, a name of the connecting party, and a message that the connection is verified. Other displays are possible. The notification 42 can be displayed at or near a top of the screen, in the middle of, or at or near the bottom of the screen. Further, the notification 42 can be displayed on the left side, right side, or center of the screen. At a minimum, the notification 42 should be large enough that a user can see the notification before or during the call.

Once the user receives notification of the call connection status, the user can decide whether to accept the call or not, such as by selecting an answer button 43 or a decline button 44, respectively. If answered and sensitive information is requested, the user can be assured that the sensitive information to be provided will be protected based on the secure call connection.

Figure 4:
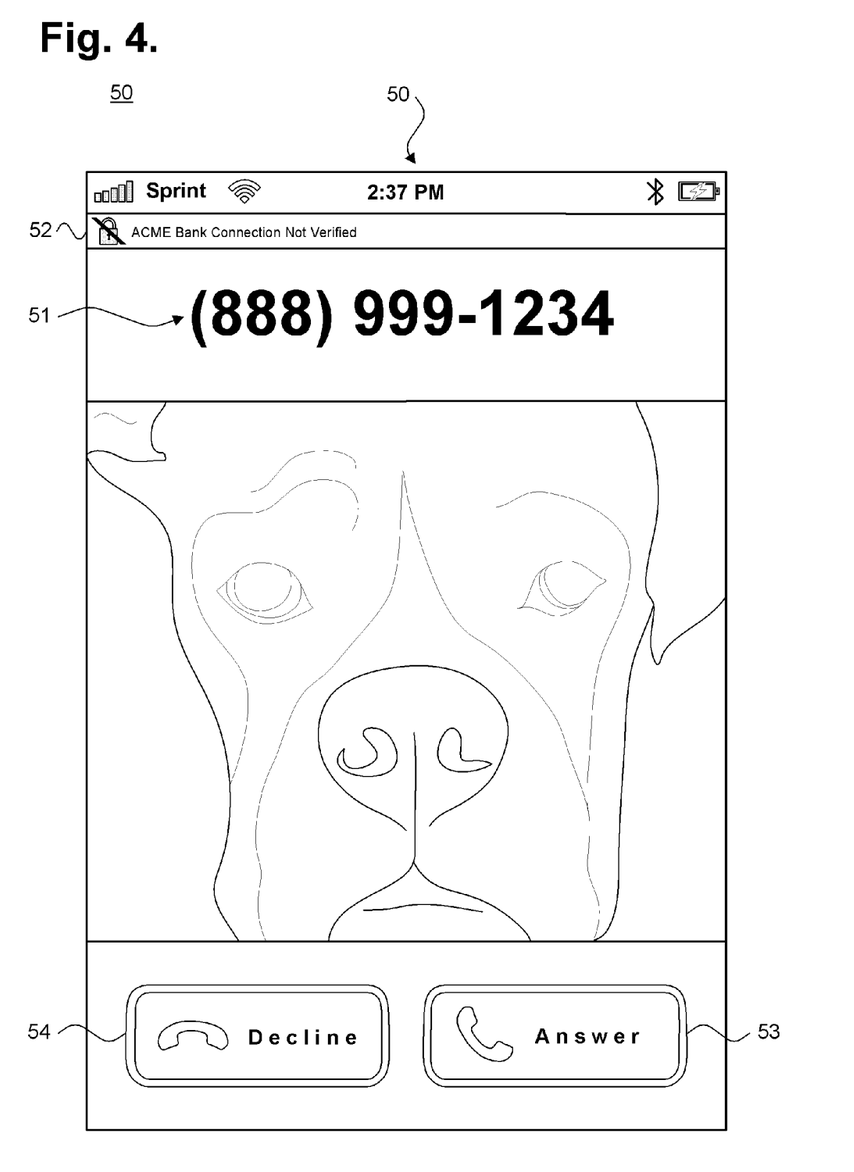
FIG. 4 is a screenshot showing, by way of example, notice of a non-secure call connection for an incoming call.

When the connection is not secure, notification of the non-secure connection is displayed. FIG. 4 is a screenshot 50 showing, by way of example, notice 52 of a non-secure call connection upon receipt of an incoming call. An incoming call is received from a connecting party and an identity, such as the telephone number 51, of the calling party is displayed on a screen of a computing device, such as a mobile telephone or computer. Metadata of the connecting party can be identified and analyzed to determine whether the incoming call connection is secure. If the connection is not secure, notification 52 is provided to the caller as a display on a screen of the mobile device, as described above with reference to FIG. 3. The display can include a lock symbol with a slash through the symbol and a message that the connection is not verified. Other displays are possible.

After the user receives notification of the non-secure connection, the user can decide whether or not to accept the incoming call. The user can accept the call by selecting an answer button 53 or can decline the call by selecting a decline button 54. If the user decides to accept the call, the user may decline from providing any requested sensitive information since the connecting party could not be verified, the call connection is not secure, and the sensitive information, if provided, may be breached.

Figure 5:
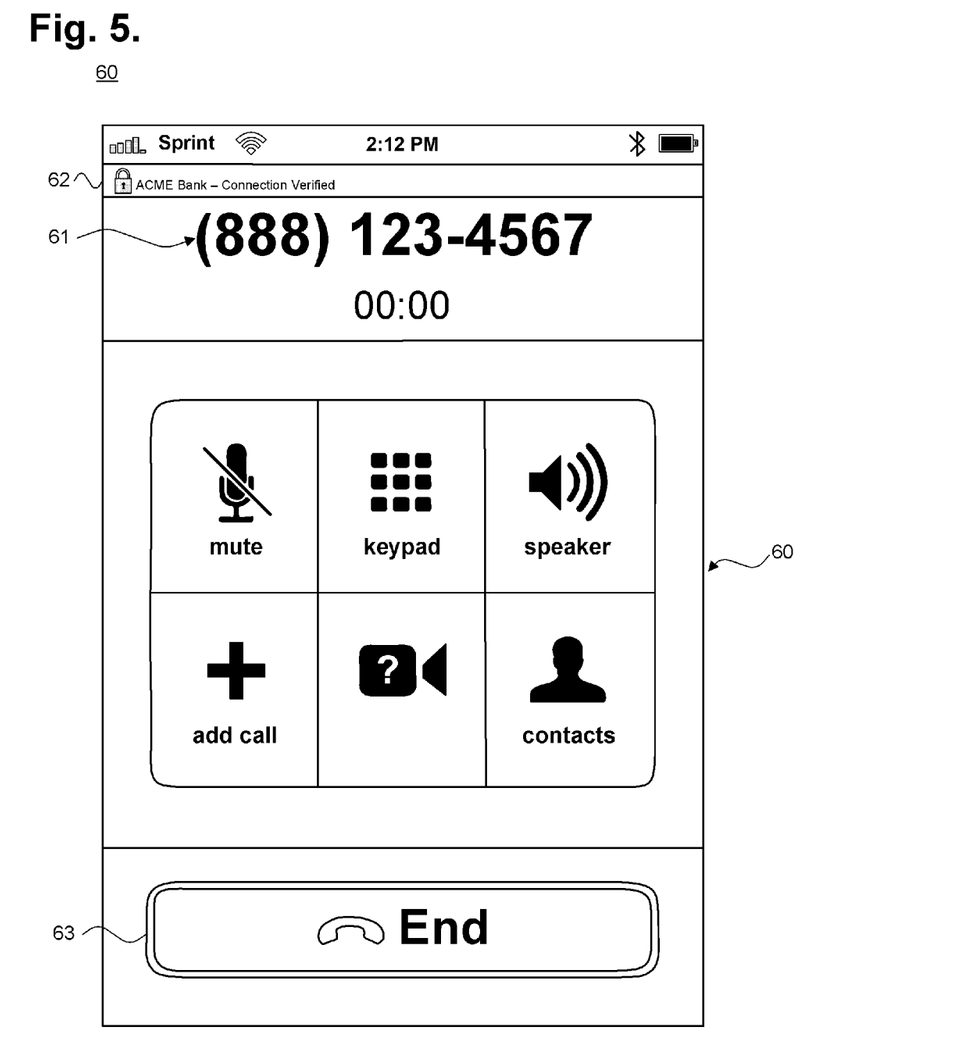
FIG. 5 is a screenshot showing, by way of example, notice of a secure call connection for an outgoing call.

Notification of call connection verification can also be provided when the user is the caller and the connecting party is the recipient of the call. FIG. 5 is a screenshot showing, by way of example, notice of a secure call connection for an outgoing call. The user makes a call by dialing a telephone number 61 of a connecting party with whom he wants to communicate. The telephone number 61 is displayed on a screen of a computing device initiating the call.

Once a ring tone is reached, metadata of the connecting party can be obtained, if available. The metadata is analyzed to determine whether the connection of the connecting party is secure. If determined to be secure, notification 61 is provided to the user on the screen of the computing device. As described above with reference to FIGS. 3 and 4, the notification can include a lock symbol, indicating a secure connection, a name of the connecting party, and a message that the connection is verified, as well as other components. The notification 42 can be displayed at or near a top of the screen, in the middle of, or at or near the bottom of the screen. Further, the notification 42 can be displayed on the left side, right side, or center of the screen. At a minimum, the notification 42 should be large enough that a user can see the notification before or during the call.

If the connection is secure, the user can comfortably provide sensitive information to the connecting party without concerns that an unauthorized party can access the information. However, if the user no longer wishes to speak to the connecting party, the user can end the call by selecting an end button 73.

Figure 6:
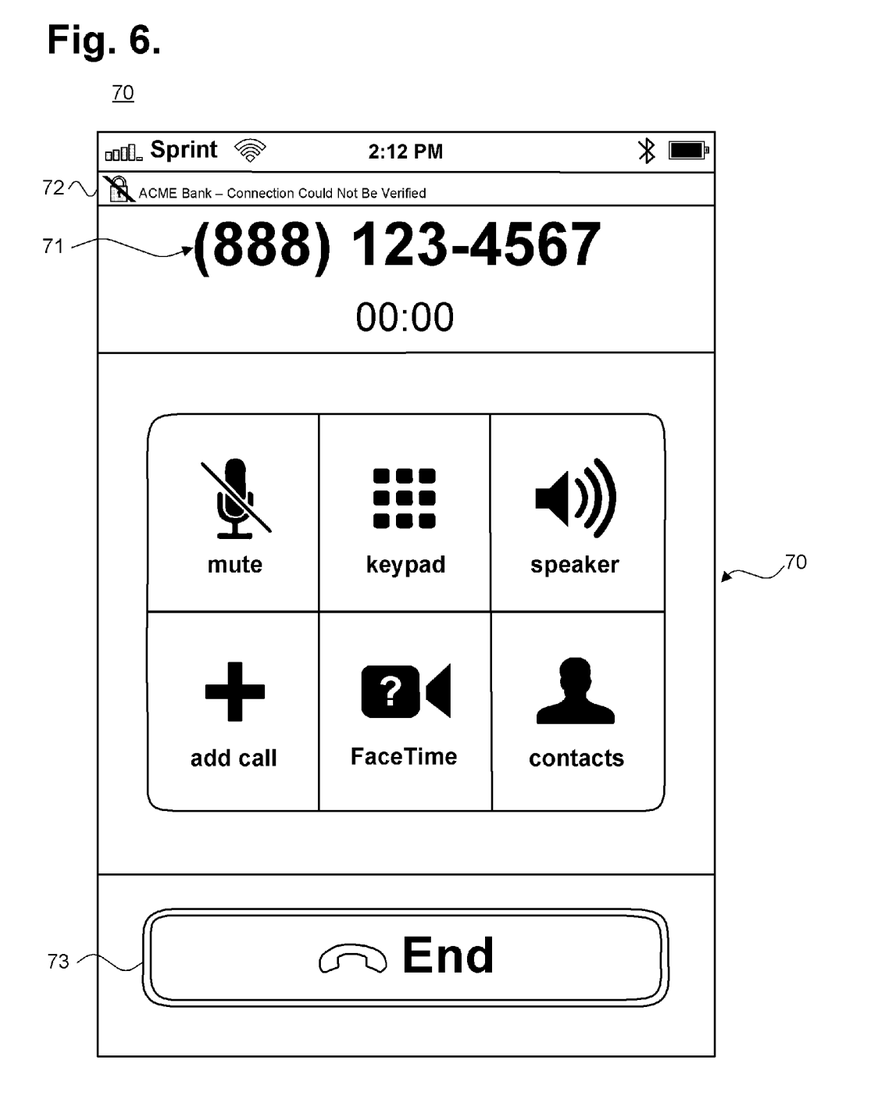
FIG. 6 is a screenshot showing, by way of example, notice of a non-secure call connection for an outgoing call.

Notification of a non-secure connection can also be displayed on an outgoing call by the user. FIG. 6 is a screenshot 70 showing, by way of example, notice 72 of a non-secure call connection for an outgoing call. The user initiates the call by dialing a telephone number 71 of the connecting party. Once the call is connected, metadata about the connecting party can be collected. The metadata is analyzed and a status of the call connection is verified. If the connection is not secure, a visual notification 72 can be provided to the user on the screen, as described above with reference to FIG. 5. The notification can include a lock symbol with a slash, indicating a non-secure connection, and a message that the connection could not be verified, as well as other components. The user can continue with the call, but may take further precaution when requested to provide sensitive information since the call connection is not secure. Alternatively, the user can terminate the call by selecting an end button 73.

Figure 7:
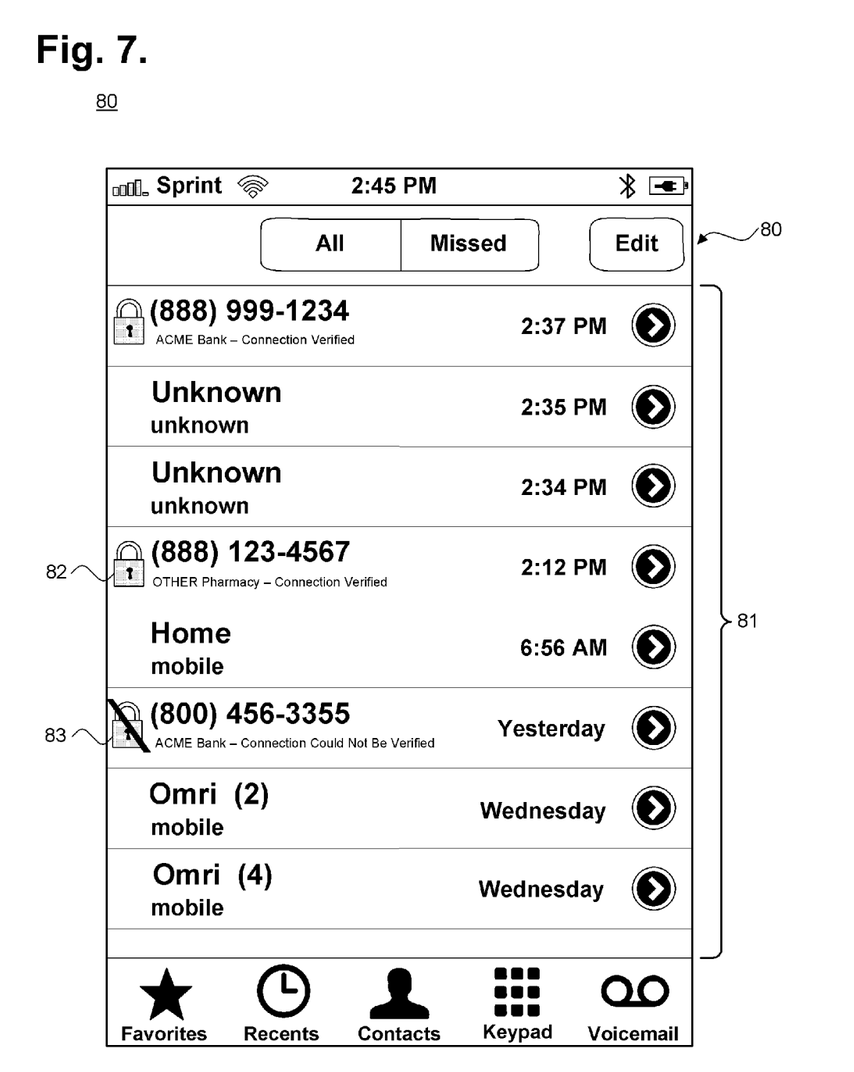
FIG. 7 is a screenshot showing, by way of example, a telephone call log of previously received secure and non-secure calls.

The call connection verification notification can also be provided in a record of the calls in a call log. FIG. 7 is a screenshot 80 showing, by way of example, a telephone call log 81 of previously received secure and non-secure calls. Previous calls, both incoming and outgoing can be recorded in a log 81. Each of the calls can be identified by the telephone number or name of a connecting party with whom the user communicates. Additionally, the verification notification 82, 83 can be displayed next to each call in the log 81. A secure notification 82 is displayed when the call connection for a call was secure and a non-secure notification 83 is displayed when the connection was not secure.

In a further embodiment, notification of call connection validation can be provided as a sound over a conventional telephone. For instance, a secure connection can be indicated by a beep noise, while a non-secure connection can be indicated by a buzz noise.

In yet a further embodiment, the notification can be visually provided as a pop-up message on a screen of a computing device, SMS text message, email, or Instant Message.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for determining call status, comprising:
 a security server to perform the following:
  receive a request from a recipient to access a web page for caller identification, wherein the web page is downloaded on a device of the recipient upon receipt of the request by the security server and a request to transfer call information from incoming and outgoing calls of the recipient is received via the web page;
  monitor the incoming and outgoing calls of the recipient upon acceptance of the request;
  identify a call from a caller to the recipient;
  determine an identity of the caller based on the transferred call information;
  confirm whether a security certificate of the caller is available;
  determine a status of the call based on one of a presence and an absence of the security certificate;
  provide the identity of the caller to the recipient; and
  determine a type of notification for the determined call status based on a type of the determined call status; and
 the determined notification type provided to the recipient with the caller identity.

2. A system according to claim 1, wherein the incoming and outgoing calls are recorded.

3. A system according to claim 1, wherein the call information is collected at a time comprising one of when the call is connected between the caller and the recipient, and the caller hears a ring tone.

4. A system according to claim 1, wherein the call comprises a voice interaction over at least one of a landline telephone, mobile telephone, and internetwork.

5. A system according to claim 1, wherein the identity of the caller comprises at least one of a name, telephone number, and unique identification code.

6. A system according to claim 1, wherein the call is accepted by the recipient or declined by the recipient based on the determined call status.

7. A system according to claim 1, wherein the security server receives sensitive information from the recipient during the call.

8. A computer-implemented method for determining call status, comprising:
 receiving via a security server a request from a recipient to access a web page for caller identification, wherein the web page is downloaded on a device of the recipient upon receipt of the request by the security server and a request to transfer call information from incoming and outgoing calls of the recipient is received via the web page;
 monitoring via the security server the incoming and outgoing calls of the recipient upon acceptance of the request;
 identifying a call from a caller to the recipient;
 determining an identity of the caller based on the transferred call information;
 confirming whether a security certificate of the caller is available;
 determining a status of the call based on one of a presence and an absence of the security certificate;
 providing the identity of the caller to the recipient;
 determining a type of notification for the determined call status based on a type of the determined call status; and
 delivering the notification with the caller identity.

9. A method according to claim 8, wherein the incoming and outgoing calls are recorded.

10. A method according to claim 8, wherein the call information is collected when the call is connected between the caller and the recipient or when the caller hears a ring tone.

11. A method according to claim 8, wherein the call comprises a voice interaction over at least one of a landline telephone, mobile telephone, and internetwork.

12. A method according to claim 8, wherein the identity of the caller comprises at least one of a name, telephone number, and unique identification code.

13. A method according to claim 8, wherein the call is accepted by the recipient or declined by the recipient based on the determined call status.

14. A method according to claim 8, wherein the security server receives sensitive information from the recipient during the call.

15. A method according to claim 8, wherein the sensitive information from the recipient is encrypted prior to providing the sensitive information to the caller.

16. A method according to claim 8, wherein the notification is provided via as a sound through the device, a text message, an Instant message, an email, and a display on the device comprising one of a picture, symbol, and text.

17. A method according to claim 8, wherein the device of the recipient comprises one of a mobile computing device and a computer.

18. A system according to claim 1, wherein the sensitive information from the recipient is encrypted prior to providing the sensitive information to the caller.

19. A system according to claim 1, wherein the notification is provided via as a sound through the device, a text message, an Instant message, an email, and a display on the device comprising one of a picture, symbol, and text.

20. A system according to claim 1, wherein the device of the recipient comprises one of a mobile computing device and a computer.

* * * * *